United States Patent
Bradfield (10) Patent No.: US 12,368,332 B2
(45) Date of Patent: Jul. 22, 2025

(54) INTEGRATED STATOR COOLING JACKET SYSTEM

(71) Applicant: BorgWarner Inc., Auburn Hills, MI (US)

(72) Inventor: Michael Duane Bradfield, Anderson, IN (US)

(73) Assignee: BORGWARNER INC., Auburn Hills, MI (US)

(*) Notice: Subject to any disclaimer, the term of this patent is extended or adjusted under 35 U.S.C. 154(b) by 0 days.

(21) Appl. No.: 18/493,138

(22) Filed: Oct. 24, 2023

(65) Prior Publication Data

US 2024/0055915 A1    Feb. 15, 2024

Related U.S. Application Data (63) Continuation of application No. 17/723,618, filed on Apr. 19, 2022, which is a continuation-in-part of (Continued)

(51) Int. Cl.
*H02K 1/20* (2006.01)
*H02K 9/193* (2006.01)

(52) U.S. Cl.
CPC ............... *H02K 1/20* (2013.01); *H02K 9/193* (2013.01)

(58) Field of Classification Search
CPC ............ H02K 1/20; H02K 5/203; H02K 9/19; H02K 9/193
(Continued)

(56) References Cited

U.S. PATENT DOCUMENTS

| 3,299,738 A | * | 1/1967 | Sand | ....................... F16H 41/30 74/606 R |
| 4,330,726 A | | 5/1982 | Albright | |

(Continued)

FOREIGN PATENT DOCUMENTS

| CN | 101232211 A | 7/2008 |
| CN | 101790831 A | 7/2010 |

(Continued)

OTHER PUBLICATIONS

Chinese Application No. 202080009172.9 filed Jul. 14, 2021; Chinese Office Action dated Oct. 21, 2023; 10 pages.
(Continued)

*Primary Examiner* — Alex W Mok
(74) *Attorney, Agent, or Firm* — CANTOR COLBURN LLP (57) ABSTRACT

An electric machine includes a housing having an inner surface, an upper portion, and a bottom portion. The bottom portion supports a coolant inlet, and a coolant outlet. A stator is mounted in the housing. The stator includes a plurality of stator laminations having a first end turn and a second end turn. The plurality of stator laminations includes a coolant flow path having a plurality of coolant channels that extend circumferentially about the stator. A first portion of the plurality of coolant channels direct a coolant circumferentially about the stator in a clockwise direction and a second portion of the plurality of coolant channels direct the coolant circumferentially about the stator in a counter-clockwise direction. The coolant flow path includes a first outlet and a second outlet. The first outlet directs onto the first end turn, and the second outlet directs coolant onto the second end turn.

17 Claims, 8 Drawing Sheets

Related U.S. Application Data application No. 16/739,264, filed on Jan. 10, 2020, now Pat. No. 11,811,294, application No. 18/493,138, filed on Oct. 24, 2023 is a continuation of application No. 17/075,768, filed on Oct. 21, 2020.

(60) Provisional application No. 62/793,215, filed on Jan. 16, 2019, provisional application No. 62/929,844, filed on Nov. 2, 2019, provisional application No. 62/930,028, filed on Nov. 4, 2019.

(58) Field of Classification Search
USPC .......................................................... 310/58
See application file for complete search history.

(56) References Cited

U.S. PATENT DOCUMENTS

| | | | |
|---|---|---|---|
| 4,912,350 A | 3/1990 | Parshall et al. | |
| 5,197,421 A * | 3/1993 | Hara ................... | F01L 1/34406 123/90.31 |
| 5,331,238 A | 7/1994 | Johnsen | |
| 5,666,016 A | 9/1997 | Cooper | |
| 5,845,756 A * | 12/1998 | Dairokuno ............. | B60K 23/02 192/85.61 |
| 6,201,365 B1 * | 3/2001 | Hara ........................ | B60L 1/02 903/952 |
| 6,323,613 B1 * | 11/2001 | Hara ...................... | H02K 16/00 903/952 |
| 7,102,260 B2 * | 9/2006 | Takenaka ................. | H02K 5/18 310/52 |
| 7,633,194 B2 | 12/2009 | Dawsey | |
| 7,749,122 B2 * | 7/2010 | Yoneyama ............... | F16H 61/12 475/116 |
| 7,946,118 B2 * | 5/2011 | Hippen ................... | F02B 39/14 184/6.24 |
| 8,201,316 B2 | 6/2012 | Rippel et al. | |
| 8,269,384 B2 | 9/2012 | Bradfield | |
| 8,269,393 B2 | 9/2012 | Patel et al. | |
| 8,378,550 B2 * | 2/2013 | Bradfield ................. | H02K 9/00 310/58 |
| 8,395,287 B2 | 3/2013 | Bradfield | |
| 8,427,018 B2 | 4/2013 | Dutau et al. | |
| 8,629,585 B2 * | 1/2014 | Bradfield ................. | H02K 9/19 310/52 |
| 8,866,353 B2 * | 10/2014 | Miyama .................. | H02K 11/33 310/58 |
| 8,872,399 B2 | 10/2014 | Chamberlin et al. | |
| 8,970,075 B2 * | 3/2015 | Rippel ...................... | H02K 1/32 310/60 A |
| 9,306,433 B2 * | 4/2016 | Sten ........................ | H02K 9/193 |
| 9,762,106 B2 * | 9/2017 | Gauthier ................. | H02K 1/32 |
| 9,903,242 B2 * | 2/2018 | Long ..................... | F01M 11/061 |
| 9,960,654 B2 * | 5/2018 | Bradfield ................. | H02K 5/18 |
| 10,333,365 B2 | 6/2019 | Patel et al. | |
| 10,389,211 B2 * | 8/2019 | Bradfield ................. | H02K 5/203 |
| 10,621,541 B2 * | 4/2020 | Andres ................... | G06Q 10/08 |
| 11,025,114 B2 | 6/2021 | Sridharan et al. | |
| 2003/0048015 A1 | 3/2003 | Tornquist et al. | |
| 2003/0193256 A1 | 10/2003 | Liebermann | |
| 2004/0045749 A1 * | 3/2004 | Jaura ................... | F16H 57/0412 903/952 |
| 2006/0284511 A1 | 12/2006 | Evon et al. | |
| 2007/0013241 A1 | 1/2007 | Schiferl et al. | |
| 2008/0100159 A1 | 5/2008 | Dawsey et al. | |
| 2011/0298316 A1 * | 12/2011 | Bradfield ............... | H02K 5/203 310/58 |
| 2011/0298317 A1 * | 12/2011 | Bradfield ................. | H02K 9/19 310/58 |
| 2011/0298318 A1 * | 12/2011 | Bradfield ................. | H02K 5/203 310/58 |
| 2011/0304227 A1 * | 12/2011 | Bradfield ................. | H02K 5/18 310/52 |
| 2012/0074799 A1 * | 3/2012 | Bradfield ................. | H02K 1/185 310/58 |
| 2012/0080117 A1 * | 4/2012 | Bradfield ................. | H02K 5/203 141/1 |
| 2012/0080964 A1 | 4/2012 | Bradfield | |
| 2012/0091834 A1 * | 4/2012 | Bradfield ................. | H02K 5/203 310/54 |
| 2013/0049495 A1 * | 2/2013 | Matsuo ................ | G06F 16/1748 310/59 |
| 2013/0076166 A1 | 3/2013 | Chamberlin et al. | |
| 2013/0119793 A1 * | 5/2013 | Hofkirchner .......... | H02K 5/203 310/54 |
| 2013/0214624 A1 * | 8/2013 | Kubes ...................... | H02K 9/19 310/54 |
| 2014/0070640 A1 | 3/2014 | Tolpadi et al. | |
| 2015/0076935 A1 | 3/2015 | Bulatow et al. | |
| 2016/0149448 A1 | 5/2016 | Koenig et al. | |
| 2016/0149450 A1 | 5/2016 | Horii et al. | |
| 2016/0211713 A1 | 7/2016 | Patel et al. | |
| 2016/0241093 A1 | 8/2016 | Patel et al. | |
| 2016/0372983 A1 | 12/2016 | Okochi | |
| 2017/0144532 A1 * | 5/2017 | Tokozakura ........... | B60K 6/445 |
| 2019/0291570 A1 * | 9/2019 | Tang ...................... | B60K 11/04 |
| 2020/0227977 A1 | 7/2020 | Bradfield | |
| 2020/0389070 A1 * | 12/2020 | Bradfield ................. | H02K 1/20 |
| 2021/0367461 A1 | 11/2021 | Barti et al. | |
| 2022/0239170 A1 | 7/2022 | Bradfield | |
| 2023/0179037 A1 | 6/2023 | Bradfield | |
| 2023/0179049 A1 | 6/2023 | Fulton et al. | |
| 2023/0246499 A1 | 8/2023 | Sridharan et al. | |
| 2024/0006961 A1 | 1/2024 | Bradfield | |

FOREIGN PATENT DOCUMENTS

| | | |
|---|---|---|
| CN | 102893496 A | 1/2013 |
| CN | 102934328 A | 2/2013 |
| CN | 103155376 A | 6/2013 |
| CN | 103326483 A | 9/2013 |
| CN | 105048662 A | 11/2015 |
| CN | 106716794 A | 5/2017 |
| CN | 207150273 U | 3/2018 |
| CN | 111769674 A | 10/2020 |
| DE | 102015215762 A1 | 2/2017 |
| DE | 102017213960 A1 | 2/2019 |
| JP | 2006033916 A | 2/2006 |
| JP | 2014057507 A | 3/2014 |

OTHER PUBLICATIONS

International Search Report and Written Opinion mailed May 8, 2020 in PCT/US2020/013073; 10 pages.

* cited by examiner

INTEGRATED STATOR COOLING JACKET SYSTEM

CROSS REFERENCE TO RELATED APPLICATIONS

This application is a Continuation Applications of U.S. Continuation-in-Part application Ser. No. 17/723,618 filed Apr. 19, 2022, which claims the benefit of an earlier filing date from U.S. Non-Provisional patent application Ser. No. 16/739,264 filed Jan. 10, 2020, which claims the benefit of an earlier filing date from U.S. Provisional Application Ser. No. 62/793,215 filed Jan. 16, 2019, the entire disclosure of which is incorporated herein by reference. This application is also a Continuation of U.S. Non-Provisional application Ser. No. 17/075,768 filed Oct. 21, 2020, which claims the benefit of U.S. Provisional Application Ser. No. 62/929,844 filed Nov. 2, 2019 and U.S. Provisional Application Ser. No. 62/930,028 filed Nov. 4, 2019, the entire disclosure of which is incorporated herein by reference.

BACKGROUND OF THE INVENTION

Exemplary embodiments pertain to the art of electric motors and, more particularly, to an electric motor having an integrated stator cooling system.

During operation, electric motors produce heat. Often times, rotating components of an electric motor may support a fan member that directs a flow of air through internal motor components. The flow of air may help with smaller systems, such as alternators, and systems that are installed in in open areas, such as generators. The flow of air is not always sufficient in high output systems, particularly those installed in closed areas, such as motor vehicle engine compartments.

Electric motors that are employed as prime movers in a motor vehicle typically include a liquid coolant system. The electric motor includes a stator formed from a plurality of stator laminations and a rotor. The liquid cooling system may include an inlet that receives coolant and an outlet that guides coolant to a heat exchange system. The coolant may flow in a jacket arranged radially outwardly of a stator of the electric motor. Specifically, the coolant may flow through small openings in the housing down onto end turns of a stator winding. The coolant runs over the end turns and passes to the outlet. Transferring heat from the end turns to the coolant reduces a portion of an overall heat signature of the electric motor. However, the end turns have a relatively small surface area relative to an overall size of the stator thereby limiting cooling efficiency.

Other systems rely on direct contact between an outer surface of the stator and an inner surface of a motor housing. In some cases, a cooling jacket may be defined at the inner surface of the housing. Heat may flow from the stator, through the housing, into the coolant passing through the cooling jacket. Indirect contact between a coolant and a surface to be cooled limits heat transfer capacity. In other systems, the heat may pass from an outer surface of the stator into coolant flowing through the housing. The outer surface of the stator possess a relatively small surface area when considered in relation to an overall area of the stator laminations. Accordingly, the industry would be receptive to electric motor cooling systems that remove heat from a larger surface area of the stator directly into a coolant to increase cooing efficacy.

BRIEF DESCRIPTION OF THE INVENTION

Disclosed is an electric machine including a housing having an outer surface, an inner surface, an upper portion, and a bottom portion. The bottom portion supports a coolant inlet and a coolant outlet. A stator is mounted in the housing. The stator includes a stator core formed from a plurality of stator laminations, and a stator winding having a first end turn and a second end turn. The plurality of stator laminations includes a coolant flow path having a plurality of coolant channels that extends circumferentially about the stator. A first portion of the plurality of coolant channels direct a coolant circumferentially about the stator in a clockwise direction and a second portion of the plurality of coolant channels direct the coolant circumferentially about the stator in a counter-clockwise direction. The coolant flow path includes a first outlet and a second outlet arranged at the upper portion of the housing. The first outlet directs coolant axially outward of the plurality of stator laminations onto the first end turn, and the second outlet directing coolant axially outward of the plurality of stator laminations onto the second end turn.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
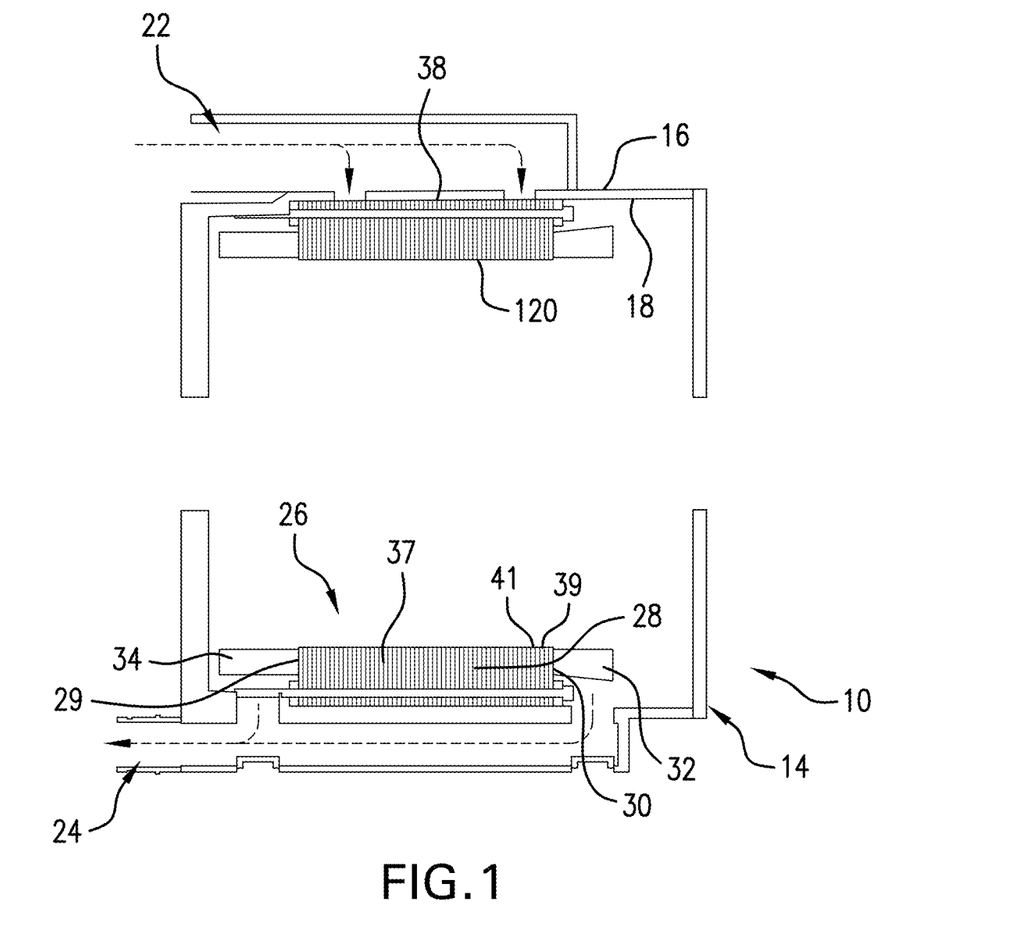
FIG. 1 depicts an electric motor including a stator formed from a plurality of stator laminations, in accordance with an aspect of an exemplary embodiment.

With initial reference to FIG. 1, an electric motor in accordance with a non-limiting example, is indicated generally at 10. Electric motor 10 includes a housing 14 having an outer surface 16 and an inner surface 18. Housing 14 also includes a coolant inlet 22 and a coolant outlet 24. The particular location and orientation of coolant inlet 22 and coolant outlet 24 may vary. Electric motor 10 includes a stator 26 arranged in housing 14. Stator 26 includes a stator core 28 having a first axial end 29 and a second axial end 30 that is opposite first axial end 29. Stator core 28 is coupled to inner surface 18 of housing 14. Stator 26 includes a first end turn 32 and a second end turn 34. In a non-limiting example, coolant inlet 22 and coolant outlet 25 are radially aligned and arranged axially inwardly of each axial end 29, 30 of stator 26.

In accordance with a non-limiting example, stator 26 is formed from a plurality of stator laminations 37 having an outer diameter 38 as will be detailed more fully herein. Stator laminations 37 are arranged in a plurality of lamination groups including a first lamination group 39 and a second lamination group 41. The number of lamination groups may vary. Second lamination group is circumferentially off-set relative to first lamination group 39. In an embodiment, second lamination group 41 may be circumferentially off-set from first lamination group 39 by about 30°.

In a non-limiting example, first lamination group 39 is formed from a first plurality of laminations 42 spaced one, from another by a corresponding one of a first plurality of channels 44. Similarly, second lamination group 41 is formed from a plurality of laminations such as shown at 46 spaced one from another by a corresponding one of a second plurality of channels 48. First and second pluralities of channels 44 and 48 form part of a coolant flow path (not separately labeled) that extends circumferentially about plurality of laminations 37.

Figure 2:
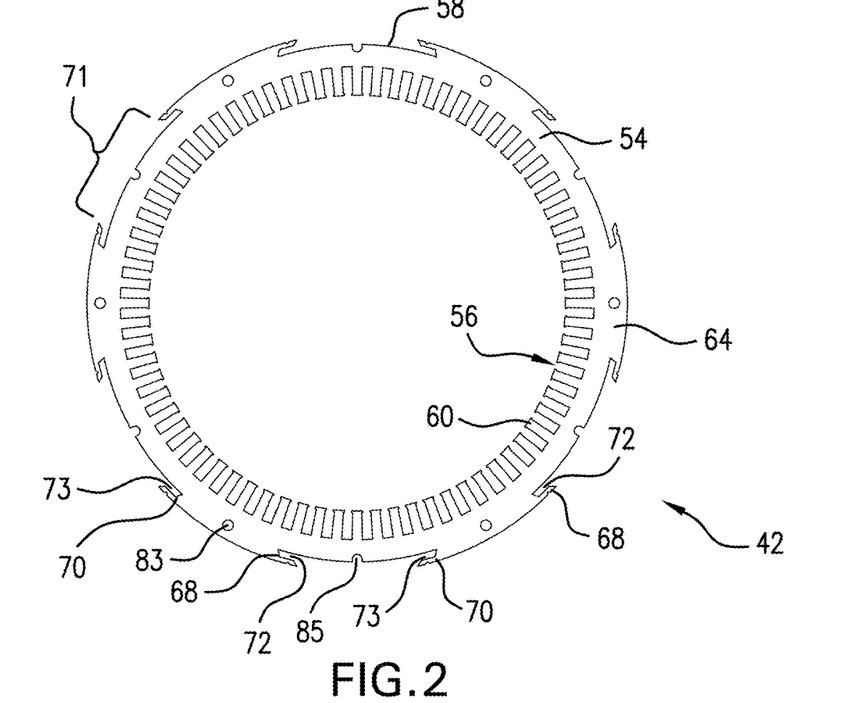
FIG. 2 depicts a stator lamination of the stator of FIG. 1.

In a non-limiting example plurality of laminations 37 is formed by stacking and interleaving the first plurality of laminations 42 of first lamination group 39 with corresponding ones of the second plurality of laminations 46 forming second lamination group 41. In a non-limiting example, each of the second plurality of laminations 46 is circumferentially offset from corresponding ones of the first plurality of laminations 42 forming first lamination group 39. The circumferential offset creates the first and second pluralities of channels 44 and 48. Each of the first plurality of channels 44 is axially and circumferentially offset relative to corresponding ones of each of the second plurality of channels 48. In a non-limiting example, inner surface 18 of housing 14 defines an outer boundary of the first and second pluralities of channels 46 and 48 and thus forms a surface of the coolant flow path 50. Reference will now follow to FIG. 2 in describing one of the first plurality of stator lamination 42 that may form part of first lamination group 39. Stator lamination 42 includes a body 54 having an inner surface section 56 and an outer surface section 58. Inner surface section 56 supports a plurality of radially inwardly projecting stator teeth 60. In accordance with an exemplary embodiment, outer surface section 58 supports a plurality of cooling channel defining members, one of which is indicated at 64. At this point, it should be understood that each of the second plurality of laminations 46 includes a second plurality of cooling channel defining members such as shown at 66 in FIG. 3. Further, it should be understood that the first plurality of laminations 42 and the second plurality of laminations 46 may be similarly formed.

In an embodiment, each cooling channel defining member 64 is radially off-set from an adjacent cooling channel defining member 64 by about 30°. It should be understood that the number of cooling channel defining members 64 may vary as may the off-set between adjacent cooling channel defining members 64. Further, the offset may be different from or may be substantially the same as the off-set between adjacent lamination groups.

In accordance with an exemplary embodiment, each cooling channel defining member 64 includes a first circumferentially extending portion 68 and a second circumferentially extending portion 70. First circumferentially extending portion 68 is spaced from second circumferentially extending portion 70 by a gap 71. First circumferentially extending portion 68 is also spaced from outer surface section 58 to establish a first cooling channel portion 72 and second circumferentially extending portion 70 is spaced from outer surface section 58 to establish a second cooling channel portion 73.

Figure 3:
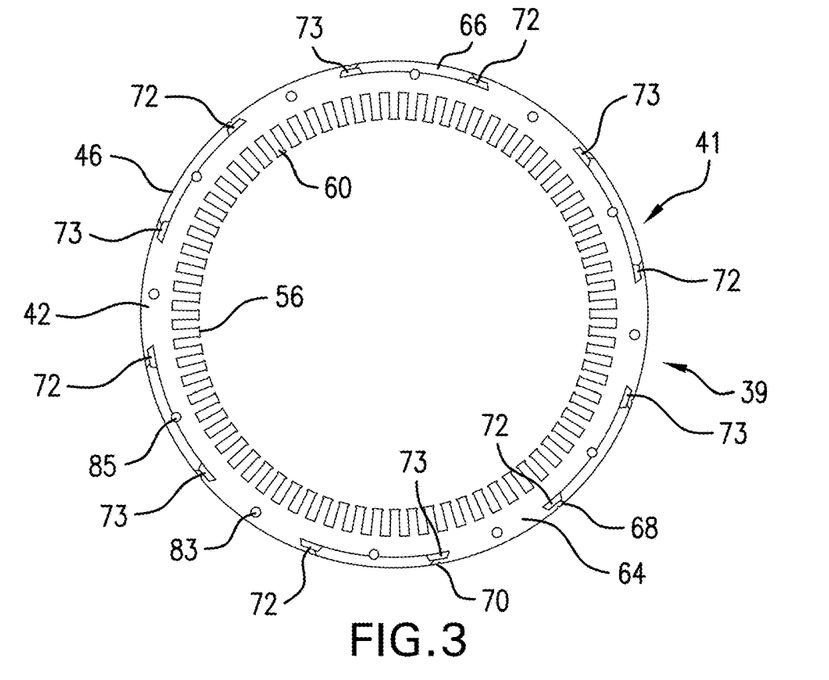
FIG. 3 depicts stator laminations arranged in a first lamination group radially off-set from stator laminations of a second lamination group, in accordance with an aspect of an exemplary embodiment.

Each of the first plurality of stator lamination 42 includes an opening 83 formed in each of the plurality of cooling channel defining members 64 and a partial opening 85 formed in third cooling channel portion 80. First and second lamination group 39 and 41 may be offset relative to one another and joined as shown in FIG. 3. In an embodiment, each circumferentially extending portion 68, 70 may include a recess or notch (not separately labeled) on an outer surface portion (also not separately labeled). The recess forms a bonding element receiving zone that may aid in joining stator 26 to inner surface 18 of housing 14. At this point, it should be understood that each of the second plurality of stator laminations 46 are similarly formed.

Figure 4:
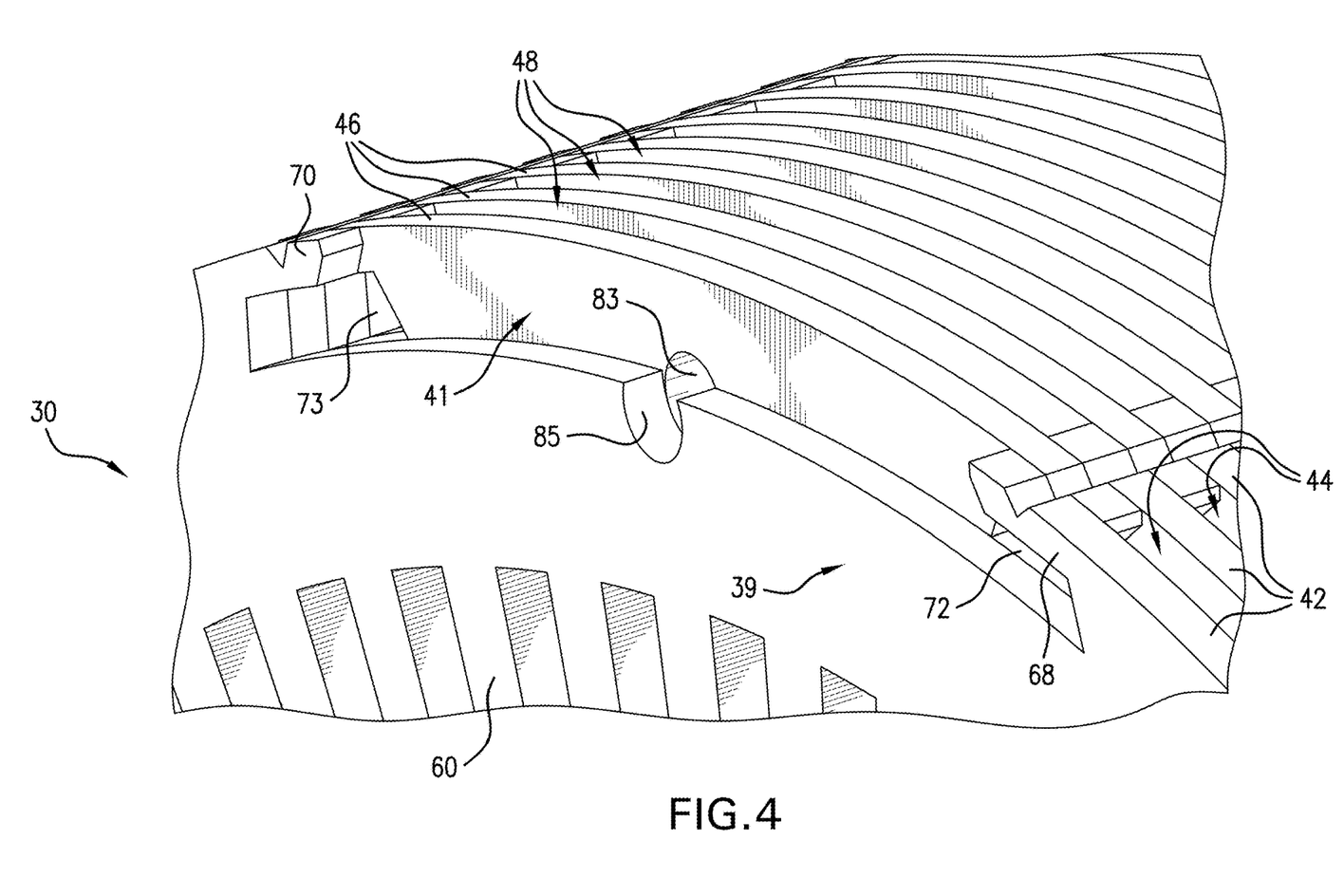
FIG. 4 depicts a coolant flow path formed from a plurality of the stator lamination groups defining the stator of FIG. 1.

In an embodiment, a number of the first plurality of stator laminations 42, for example six (6) stator laminations, may be joined to form first lamination group 39. Similarly, a number of the second plurality of stator laminations 46, for example six (6) stator laminations, may be joined to form second lamination group 41 that is circumferentially offset relative to and combined with first lamination group 39. That is, each lamination 42 may be interleaved with each lamination 46 when lamination groups 39 and 41 are formed. Additional lamination groups may be formed and joined together, each offset relative to another to form stator 26 such as shown in FIG. 4. At this point, it should be understood that the number of laminations in a lamination group may vary. Further, while channels 44 and 48 are shown as having a thickness of a single lamination, the thickness of each channels 44 and 48 may vary by adjusting how many laminations are combined prior to being interleaved.

In a non-limiting example, when first lamination group 39 and second lamination group 41 are combined, a split coolant path is formed as shown in FIG. 4. That is, coolant, such as oil, entering coolant inlet 22 (FIG. 1) passes into channels 44 and 48 and flows circumferentially about stator core 28. The coolant passes axially through coolant passages defined by first and second cooling channel portions 72 and 73, passes through first plurality and second plurality of channels 44 and 48 and enters into coolant outlet 24. Dividing coolant flow into channels 44 and 48 via first and second cooling channel portions 72 and 73 reduces a pressure drop of the coolant and thus enhances stator cooling efficiency.

In a non-limiting example, a portion of the coolant entering coolant inlet 22 flows counter-clockwise through channels 44 until reaching cooling channel portion 72. The coolant flows into cooling channel portion 72 in both axial directions. A portion of the coolant may pass from cooling channel portion 72 and flow counter-clockwise into channels 48. A second portion of the coolant flow may pass axially out the channel 72 and onto stator end turns 32 and/or 34. Additional coolant may pass into channels 48 and then into cooling channel portion 73. The second portion of the coolant may flow through cooling channel portion 73 in channel 73 in both axial directions. A third portion of the coolant may flow into an adjacent one of channels 44 and or may flow axially outwardly onto stator end turn 32 and/or 34. The pattern repeats itself counter-clockwise until all the coolant is expelled axially from cooling channel portions 72 and 73.

Figure 5:
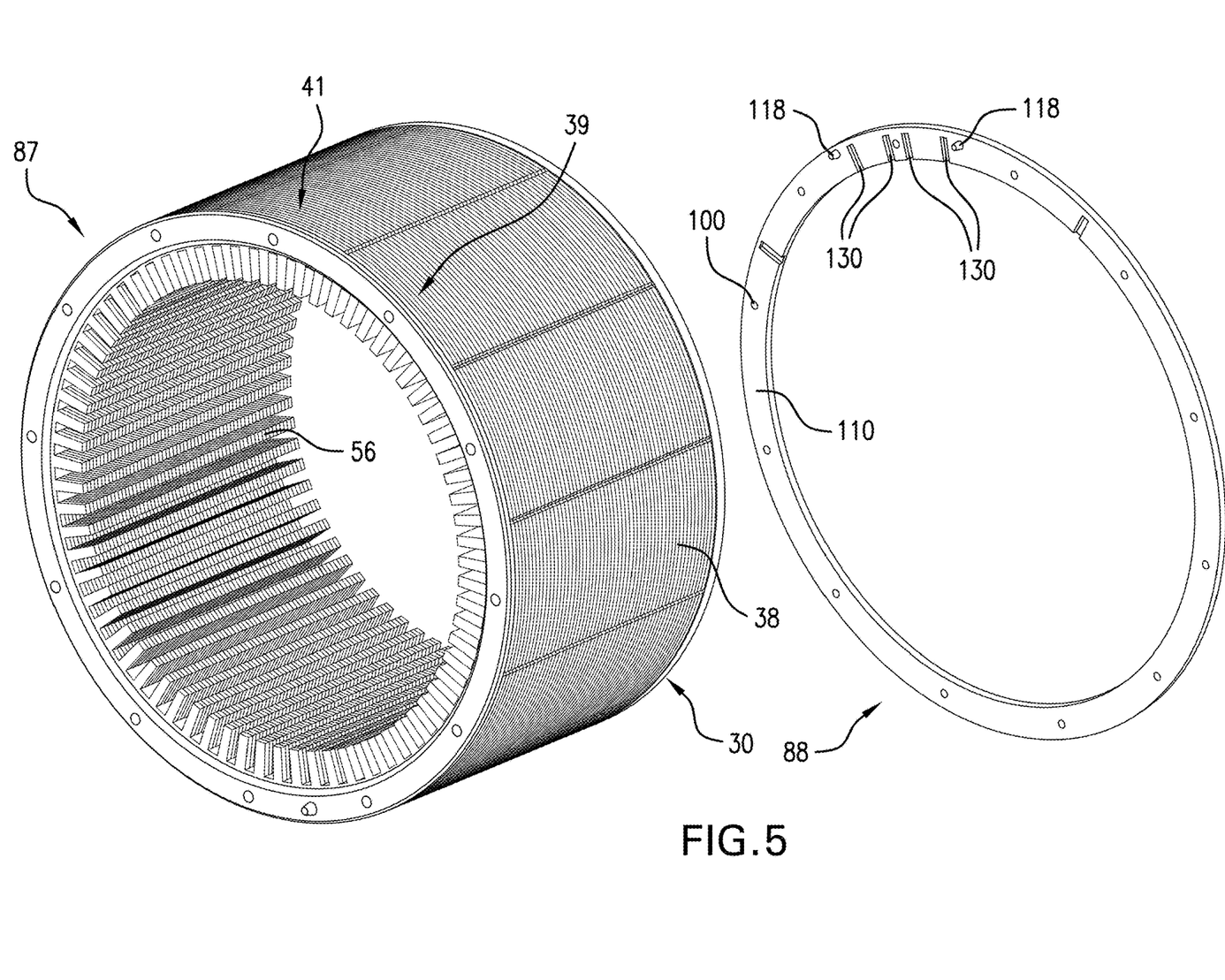
FIG. 5 depicts a partially disassembly view of the stator of FIG. 1 illustrating first and second end rings that are mounted to the stator laminations, in accordance with a non-limiting example.
Figure 6:
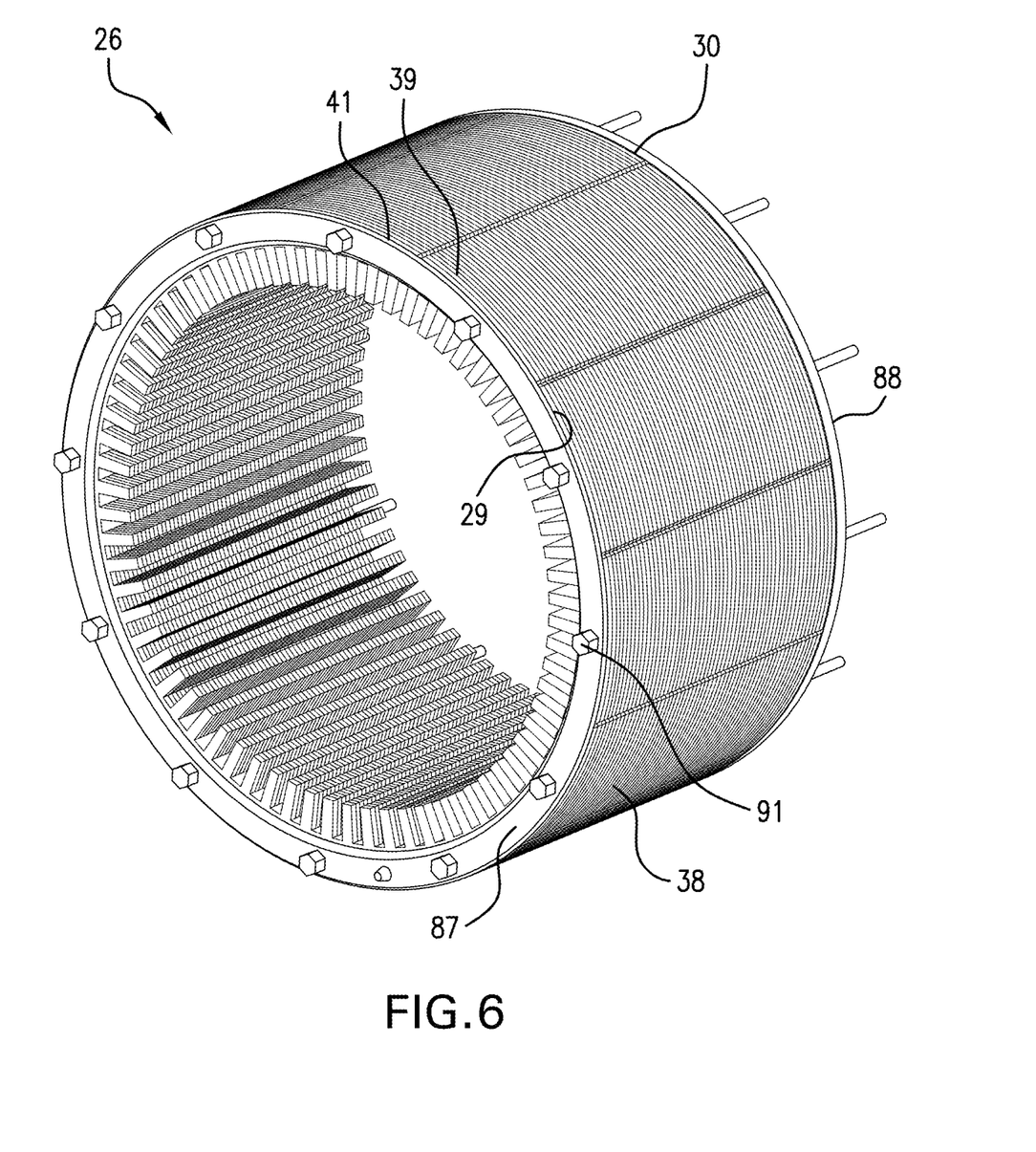
FIG. 6 depicts the first and second end rings mounted to the stator laminations, in accordance with a non-limiting example.

In a non-limiting example shown in FIG. 5, a first end ring 87 and a second end ring 88 may be installed on opposing sides of stator core 30. First and second end rings 87 and 88 may be connected through a plurality of mechanical fasteners, one of which is indicated at 91 that extend through corresponding ones of openings 83 and partial openings 85 in first and second groups of laminations 39 and 41 as shown in FIG. 6. As will be detailed herein, end rings 87 and 88 cooperate with the coolant passages defined by first and second cooling channel portions 72 and 73 to deliver coolant to first and second end turns 32 and 34 of stator 26

Figure 7:
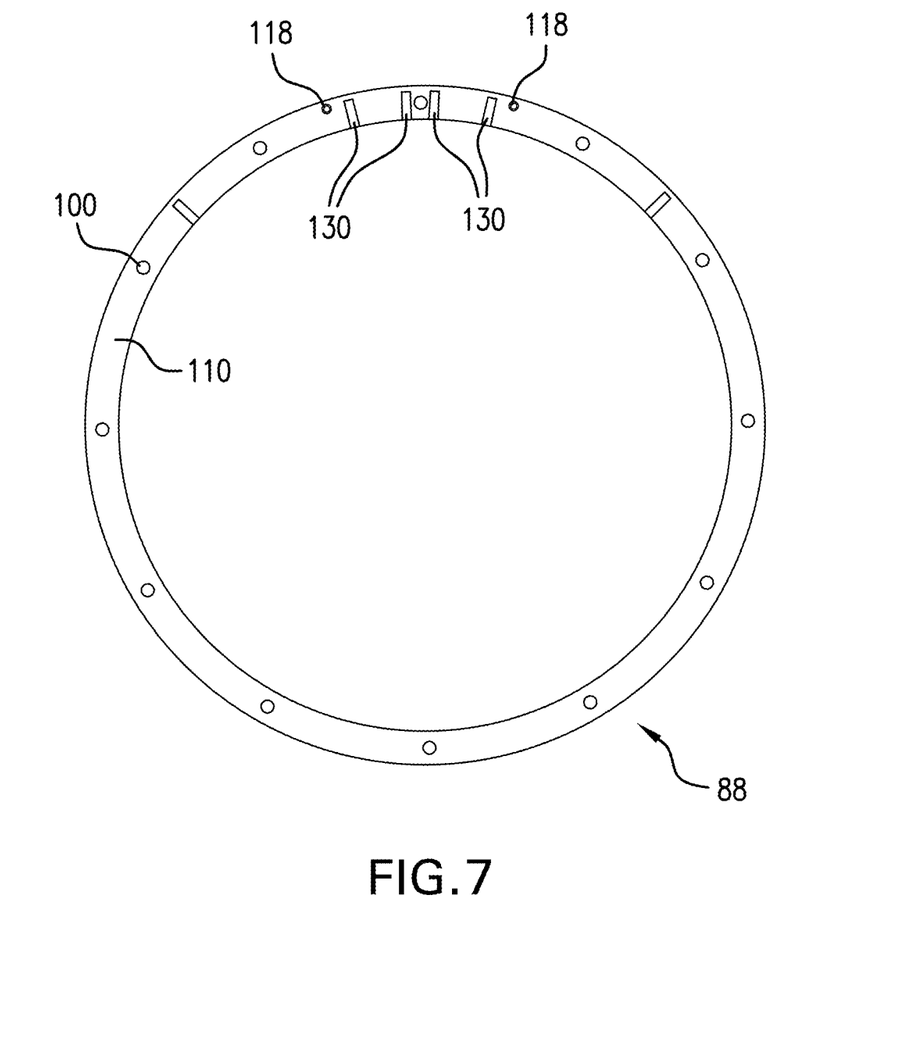
FIG. 7 is a plan view of an inner surface of the second end ring depicting coolant spray notches that guide coolant onto stator end turns, in accordance with a non-limiting example.

In a non-limiting example shown in FIG. 7, end ring 88 includes a plurality of openings, one of which is shown at 100 that are receptive of corresponding ones of the plurality of mechanical fasteners 95. End ring 88 includes an inner surface 110 that abuts one of the plurality of laminations 37. In a non-limiting example, inner surface 110 includes a plurality of locator elements 118 that orient end ring 88 to stator core 30. That is, locator elements 118 establish a selected circumferentially alignment of end ring 88 relative to stator core 30.

Figure 8:
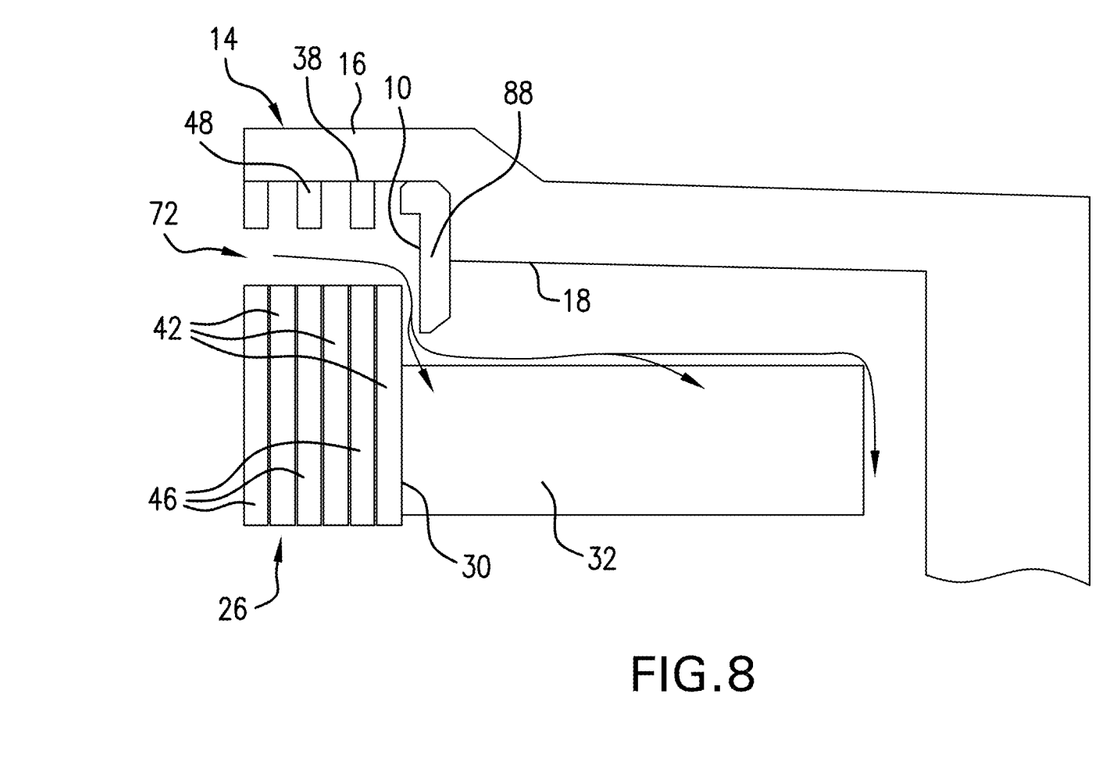
FIG. 8 is a partial cross-sectional view of the stator core depicting coolant flow passing from a coolant spray notch onto a stator end turn, in accordance with a non-limiting example.

In a non-limiting example, inner surface 110 of end ring 88 includes a plurality of coolant spray notches 130 that align with one of channels 44 and 48 and or the coolant passages defined by first and second cooling channel portions 72 and 73. The coolant spray notches 130 guide coolant onto end turn 32 as shown in FIG. 8. In this manner, not only does the coolant reduce operating temperatures of stator core 30 but also lowers stator end turn temperatures. It should be understood that while the coolant spray notches are described as being on inner surface 110 of end ring 88, additional coolant notches (not shown) are provided on end ring 87.

Figure 9:
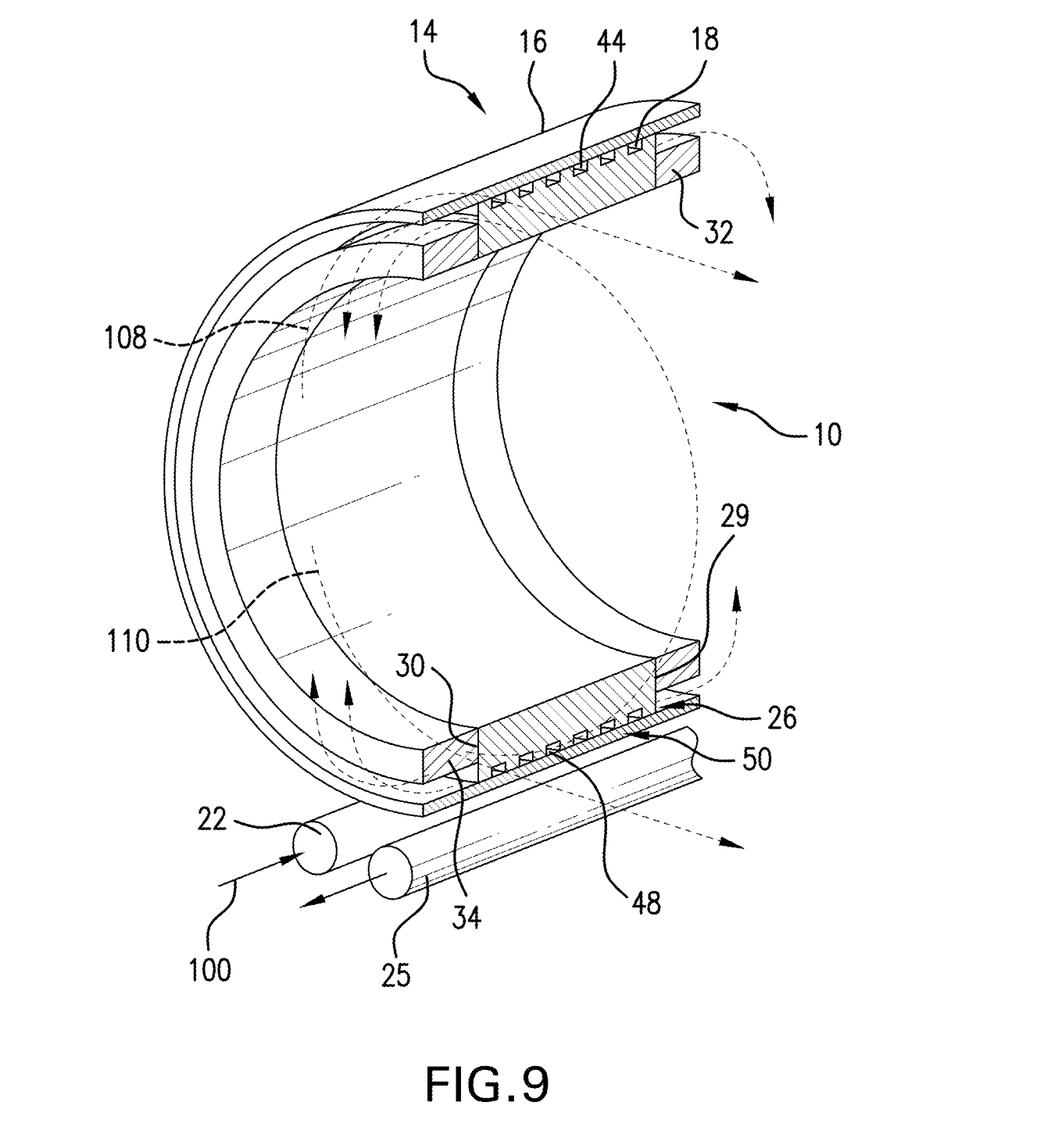
FIG. 9 is a cross-sectional view of the electric motor of FIG. 1 in accordance with a non-limiting example.

In accordance with a non-limiting example shown in FIG. 9, coolant 100 enters coolant inlet 22 and a substantially bifurcates into a first coolant flow portion 108 and a second coolant flow portion 110. First coolant flow portion 108 enters coolant flow path 50 and flows circumferentially clockwise around the stator 26 within first and second pluralities of channels 44 and 48. Second coolant flow portion 110 flows circumferentially counter-clockwise about stator 26 within first and second pluralities of channels 44 and 48.

Upon reaching channels 72 and 73, a portion of first and second coolant flows 108 and 110 flows axially across stator 26. At this point, coolant 100 exits channels 72 and 73 at each of first axial end 29 and second axial end 30 and is sprayed onto corresponding ones of first and second end turns 32 and 34. The coolant continues to flow around and through first and second end turns 32 and 34 and drops down to the bottom (not separately labeled) of housing 14. Coolant 100 collects at the bottom of housing 14 and drains through coolant outlet 25.

In one non-limiting example, illustrated in FIGS. 1 and 9 coolant inlet 22 is located axially inwardly of first and second axial end 28 and 30. Coolant outlet 25 is disposed axially outwardly of first and second axial ends 28 and 30. In addition, electric motor 10 includes a rotor (not shown) having a hollow rotor shaft (also not shown) that may carry coolant which is sprayed onto an inner diameter 120 (FIG. 1) stator 26.

At this point, it should be understood that the exemplary embodiments describe a stator that includes radially outwardly extending projections, each including circumferentially extending portions that create a tortuous or serpentine cooling channel. With this arrangement, additional surface area of the stator laminations is exposed to cooling fluid thereby enhancing heat shedding capacity. The heat shedding capacity may be increased by as much as 50% or greater compared to existing systems. Further, the increased surface area of the stator laminations provides increased flux carrying capacity of the stator that may increase performance by as much as 5%. Thus, not only does the present invention provide additional cooling but also increases an overall operational efficiency of the electric motor.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:
1. An electric machine comprising:
a housing having an outer surface, an inner surface, an upper portion, and a bottom portion, the bottom portion supporting a coolant inlet, and a coolant outlet; and
a stator mounted in the housing, the stator including a stator core formed from a plurality of stator laminations and a stator winding having a first end turn and a second end turn, the plurality of stator laminations including a coolant flow path having a plurality of coolant channels that extends circumferentially about the stator, a first portion of the plurality of coolant channels directing a coolant circumferentially about the stator in a clockwise direction and a second portion of the plurality of coolant channels directing the coolant circumferentially about the stator in a counter-clockwise direction, the coolant flow path including a first outlet and a second outlet arranged at the upper portion of the housing, the first outlet directing coolant axially outward of the plurality of stator laminations onto the first end turn, and the second outlet directing coolant axially outward of the plurality of stator laminations onto the second end turn, the stator core including a first axial end supporting a first end ring and a second axial end supporting a second end ring, wherein the first outlet comprises a first plurality of coolant spray notches formed in the first end ring and the second outlet comprises a second plurality of coolant spray notches formed in the second end ring.

2. The electric machine according to claim 1, wherein the first plurality of coolant spray notches comprise less than twelve coolant spray notches.

3. The electric machine according to claim 2, wherein the second plurality of coolant spray notches comprises less than twelve coolant spray notches.

4. The electric machine according to claim 1, wherein the second plurality of coolant spray notches includes notches having different spacing.

5. The electric machine according to claim 1, wherein the second end ring includes a plurality of locator elements that establishes a selected orientation of the second end ring relative to the second axial end of the plurality of stator laminations.

6. The electric machine according to claim 1, further comprising a plurality of mechanical fasteners connecting the first end ring to the first axial end and the second end ring to the second axial end.

7. An electric machine comprising:
a housing having an outer surface, an inner surface, an upper portion, and a bottom portion, the bottom portion supporting a coolant inlet, and a coolant outlet; and
a stator mounted in the housing, the stator including a stator core formed from a plurality of stator laminations and a stator winding having a first end turn and a second end turn, the plurality of stator laminations including a coolant flow path having a plurality of coolant channels that extends circumferentially about the stator, a first portion of the plurality of coolant channels directing a coolant circumferentially about the stator in a clockwise direction and a second portion of the plurality of coolant channels directing the coolant circumferentially about the stator in a counter-clockwise direction, the coolant flow path including a first outlet and a second outlet arranged at the upper portion of the housing, the first outlet directing coolant axially outward of the plurality of stator laminations onto the first end turn, and the second outlet directing coolant axially outward of the plurality of stator laminations onto the second end turn, wherein the plurality of stator laminations is arranged in a first lamination group and a second lamination group that is circumferentially off-set from the first lamination group, the first lamination group and the second lamination group forming the coolant flow path, wherein a first plurality of cooling channel defining members and a second plurality of cooling channel defining members include a circumferential width that is at least 3 times a radial depth of the first plurality of cooling channel defining members and the second plurality of cooling channel defining members.

8. The electric machine according to claim 7, wherein the stator core includes an outer diameter, the plurality of coolant channels being formed in the outer diameter of the stator core.

9. The electric machine according to claim 7, wherein the plurality of coolant channels includes a first plurality of coolant channels extending circumferentially about the plurality of stator laminations and further including a second plurality of coolant channels extending axially across the plurality of stator laminations.

10. The electric machine according to claim 9, wherein the first portion of the plurality of coolant channels is fluidically connected to the second portion of the plurality of coolant channels.

11. The electric machine according to claim 7, wherein the inner surface of the housing forms a surface of the coolant flow path.

12. The electric machine according to claim 7, wherein each of the plurality of stator laminations of the first lamination group and the second lamination group includes
a body having an inner surface section and an outer surface section, the inner surface section including a plurality of stator teeth; and
a plurality of cooling channel defining members integrally formed with and extending radially outwardly from the outer surface section,
wherein each of the plurality of cooling channel defining members being spaced from others of the plurality of cooling channel defining members by a corresponding gap, and
wherein each of the plurality of cooling channel defining members includes a first circumferentially extending portion and a second circumferentially extending portion that are spaced from the outer surface section, a first circumferentially extending portion of the first lamination group overlaps a second circumferentially extending portion of the second lamination group to form at least one coolant passage.

13. The electric machine according to claim 12, wherein each of the plurality of cooling channel defining members of the first lamination group includes an opening and each of the plurality of cooling channel defining members of the second lamination group including a partial opening, wherein the opening axially aligns with the partial opening.

14. The electric machine according to claim 12, wherein each cooling channel defining member is spaced from an adjacent cooling channel defining member by about 30°.

15. The electric machine according to claim 7 wherein the first lamination group includes a plurality of first lamination groups, at least two of the plurality of laminations of the first lamination group are joined together to comprise one of the plurality of first lamination groups.

16. The stator machine according to claim 15, wherein the second lamination group includes a plurality of second lamination groups, at least two of the plurality of laminations of the second group are joined together to comprise at least one of the plurality of second lamination group.

17. An electric machine comprising:
a housing having an outer surface, an inner surface, an upper portion, and a bottom portion, the bottom portion supporting a coolant inlet, and a coolant outlet; and
a stator mounted in the housing, the stator including a stator core formed from a plurality of stator laminations and a stator winding having a first end turn and a second end turn, the plurality of stator laminations including a coolant flow path having a plurality of coolant channels that extends circumferentially about the stator, a first portion of the plurality of coolant channels directing a coolant circumferentially about the stator in a clockwise direction and a second portion of the plurality of coolant channels directing the coolant circumferentially about the stator in a counter-clockwise direction, the coolant flow path including a first outlet and a second outlet arranged at the upper portion of the housing, the first outlet directing coolant axially outward of the plurality of stator laminations onto the first end turn, and the second outlet directing coolant axially outward of the plurality of stator laminations onto the second end turn, wherein the coolant inlet includes at least two coolant inlets extending through the housing at an outer diameter of the stator laminations and fluidly connected to the coolant channels.

* * * * *